June 15, 1926.
A. F. MASURY ET AL
1,588,974
STEERING CONNECTION FOR MOTOR VEHICLES
Filed Oct. 25, 1922
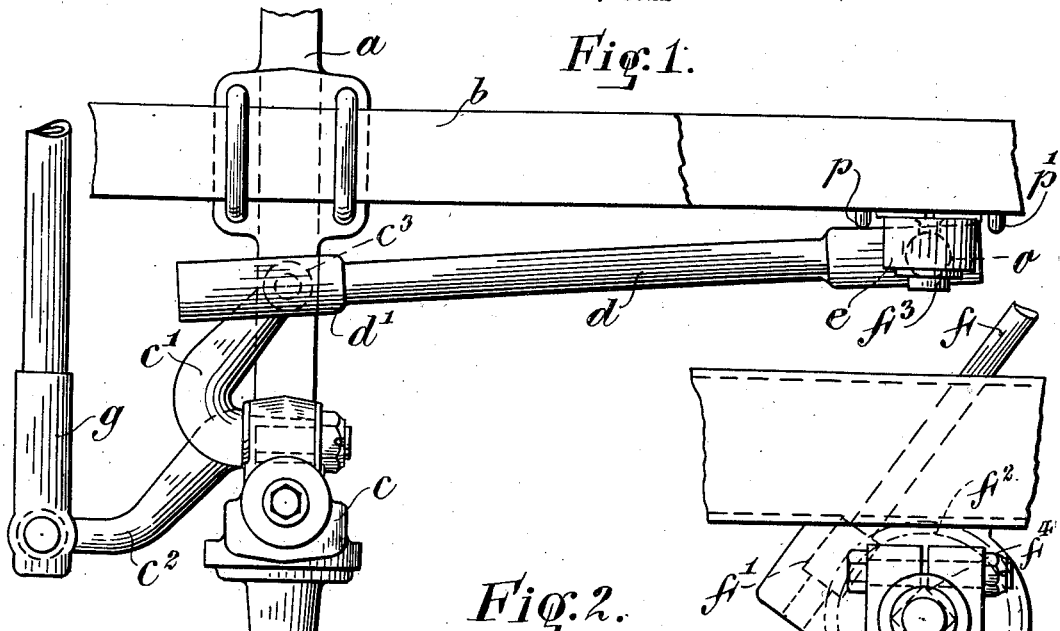
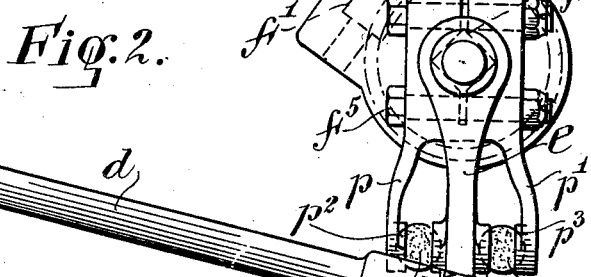
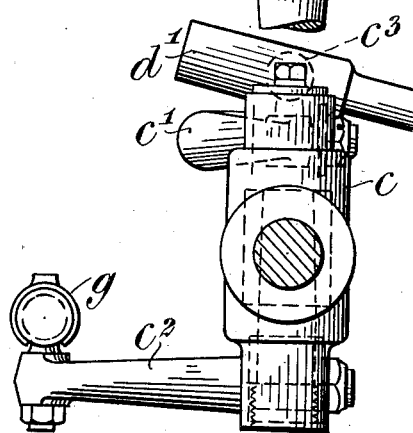
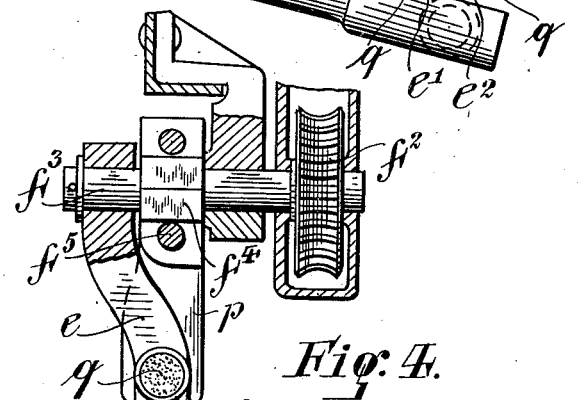
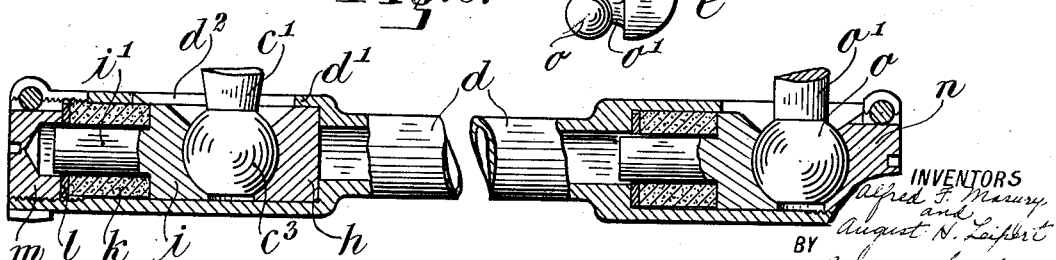
INVENTORS
Alfred F. Masury
and
August N. Leipert
BY
Redding & Greeley
ATTORNEYS Patented June 15, 1926.

1,588,974

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

STEERING CONNECTION FOR MOTOR VEHICLES.

Application filed October 25, 1922. Serial No. 596,738.

This invention relates to an improved steering connection for motor vehicles and has for its principal object to provide nonmetallic cushioning elements in the connection at such points as will relieve the metallic elements and the driver's hands of road shocks from the wheels which are found to impress undue stresses on the elements and fatigue the driver through constant vibrations and oscillations of the steering wheel. More particularly, the invention has to do with the interposition of rubber blocks under compression between metallic elements of the steering connection.

A further object of the invention is to provide a loose connection between the drag link and the steering arm whereby movements from one to the other are imparted through non-metallic elements. Other objects of the invention have to do with the provision of simple elements so related and mounted as to be readily accessible and facilitate assembling and disassembling.

The invention will be described more particularly with reference to the embodiment illustrated in the accompanying drawings, by way of example, and in which:

Figure 1 is a view in plan of so much of a steering connection including a tie rod as is necessary for an understanding of the application of the improvements to a motor vehicle.

Figure 2 is a view in elevation of the parts shown in Figure 1.

Figure 3 is a detail fragmentary view partly in section of a drag link embodying the improvements, one of the arms connected thereto being displaced through an angle of 90° in the interest of clearness.

Figure 4 is a detail view in transverse section showing the improved connection between the drag link and the steering arm.

The invention is not concerned with the particular construction of the steering connection employed, apart from the incorporation of the improvements therein, nor to the relation of the elements of the motor vehicle to which the connection is applied. As shown in Figure 1, however, it may be supposed that the axle $a$ carries a spring $b$ and has pivoted to its end a steering knuckle $c$ carrying an arm $c'$ connected to a drag link $d$ which is actuated from a steering arm $e$ connected operatively to the steering post $f$ in a manner to be described hereinafter. The knuckle $c$ may also be connected through an arm $c^2$ to a tie rod $g$ which may be connected in a similar manner to the knuckle of the other wheel of the pair. Road shocks impressed on the wheel cause the knuckle $c$ to move or oscillate constantly and these shocks are transmitted through the connections described to the steering wheel and impressed on the hands of the driver. In some cases it has been found that the shocks are so great as to set up such stresses on the elements of the connection as to cause breakage and excessive wear. The condition, in any event, is unsatisfactory from a mechanical standpoint and distressing to the driver. The principal object of the present invention is to absorb these shocks and vibrations at some point as near to the wheel as possible and certainly before they are transmitted in full to the steering post $f$. The action desired is a cushioning one through non-metallic means so as to relieve the metal parts of excessive stresses and wear and also relieve the driver from the fatiguing oscillations and vibrations usually transmitted back to the steering wheel. With this teaching, it will be understood by one skilled in the art that the results may be attained by interposing non-metallic cushioning elements at points in the connection other than those illustrated herein. However, the illustrated embodiment is a thoroughly practical one and will illustrate the principle on which the invention rests. As shown in Figure 3 the drag link $d$ may be formed with a sleeve $d'$ at one end slotted at $d^2$ to receive the end of the knuckle arm $c'$ which is generally spherical in form as indicated at $c^3$. Within the sleeve $d'$ are slidably disposed two ball socket blocks $h$, $i$, which receive the ball $c^3$. One of the blocks $h$ is seated at the inner end of the sleeve $d'$. The other block $i$ is pressed into engagement with the ball $c^3$ by means of a block $k$ of yielding non-metallic material such as rubber. This block is held in place within the sleeve $d'$ by any suitable means illustrated as a disk $l$ backed up by a plug cap $m$ threaded into the end of the sleeve. If desired, the block $k$ may have an opening therein to receive a guide stem $i'$ carried with the block $i$. The block $k$ is clamped under compression against the block $i$ so as to press the latter yieldingly against the ball $c^3$ and hold it in operative relation to the other block $h$. The effect of securing the rubber block $k$ under compression is, further, to render it durable in use since it has been found that rubber under compression will withstand stresses over a great period of time.

The other end of the drag link may be similarly constructed but with a reversal of parts, the plug cap $n$ in such case, if desired, being formed with a seat to co-operate directly with the ball end $o$ of the swinging steering arm $o'$. The action of the parts thus far described is to absorb shocks and vibrations impressed on the knuckle arm $c'$ as close to the knuckle $c$ as possible and to further cushion these shocks and vibrations at the point where the drag link $d$ is connected to the steering arm $o'$. Metal to metal transmission of these stresses is thereby eliminated so that the parts are relieved from the excessive wear and danger of breakage which has heretofore been present in steering connections and the cushioning of these shocks and vibrations is such as to relieve the driver's hands from the usual fatiguing oscillations of the steering wheel.

A further feature of the invention in line with the general objects pointed out is concerned with an improved connection between the steering arm $o'$ and the steering post $f$ whereby steering stresses are transmitted to the drag link through non-metallic yielding material and steering gear and post are relieved of road shocks which cause excessive wear and sometimes breakage. A conventional type of connection between the post $f$ and the steering arm $e$ is illustrated as a worm $f'$ engaged with a worm wheel $f^2$ keyed to a shaft $f^3$ which may be oscillated by the post for the transmission of steering efforts to the drag link $d$. Ordinarily, the steering arm $e$ is keyed to the oscillating shaft $f^3$ and engaged with the drag link through metal to metal contact. In the improved construction, however, it is proposed to mount the steering arm $e$ loosely on the shaft $f^3$ while connecting its ball end $o$ to the drag link $d$ in the manner before described. On the shaft $f^3$ are secured one or more depending arms $p$, $p'$, which actually constitute the steering arm connections. A simple and convenient construction is illustrated. The shaft $f^3$ is shown as squared at $f^4$ as are the bearing faces of the arms $p$, $p'$. The squared surfaces are bolted on to the squared shaft $f^4$ as by bolts $f^5$ and the lower ends of the arms $p$, $p'$, may be formed with seats $p^2$, $p^3$, respectively, to receive the non-metallic cushioning elements shown as spheres $q$ of rubber or the like. The opposite sides of the loose arm $e$ may also be formed with seats $e'$, $e^2$, opposite to the seats $p^2$, $p^3$, respectively, so that the spheres $q$ will be embraced between the seats described, respectively. It is proposed to confine the spheres $q$ under compression and to this end, the space between the arms $p$, $p'$ and the arm $e$, will be such with respect to the size of the units $q$ as to cause these units to be compressed when the bolts $f^5$ are set up on.

The action of the steering arms will now be clear. When the shaft $f^3$ is oscillated through the worm gear $f^2$ a steering effort will be transmitted through one or the other of the arms $p$, $p'$, and the non-metallic elements $q$ to the loose arm $e$ which is engaged with the drag link $d$. Contrariwise shocks and vibrations impressed on the drag link $d$ from the knuckle $c$ will not impress undue stresses on the shaft $f^3$ or the steering post $f$ by reason of the location of the cushioning elements $q$.

It is evident that the tie rod $g$ may be connected to the knuckle arm $c^2$ through a connection which also includes a non-metallic cushioning element.

Changes in details of construction and arrangement of parts may be made by one skilled in the art.

What we claim is:

In a steering connection for motor vehicles, in combination with a steering post and drag link, an oscillating steering shaft connected operatively with the steering post, a bifurcated member rigidly attached to said steering shaft, seats formed on the opposed faces of each branch thereof, an arm loosely mounted on the shaft and having its lower end connected with the drag link, the lower end of said arm curved to extend between the branches of the bifurcated member, seats formed upon the arm, and cushioning elements of yielding non-metallic material operatively interposed under internal static pressure between the seats on the first named arm and the bifurcated member.

This specification signed this 23 day of October A. D. 1922.

ALFRED F. MASURY.
AUGUST H. LEIPERT.